ELECTROMECHANICAL TUNED FILTER

Filed Jan. 26, 1960 2 Sheets-Sheet 1

INVENTOR.

Daniel C Kuenzig

BY

Ralph Hammar
Attorney

INVENTOR.
Daniel C Kuenzig
BY Ralph Hammar
Attorney

United States Patent Office
3,176,251
Patented Mar. 30, 1965

3,176,251
ELECTROMECHANICAL TUNED FILTER

Daniel C. Kuenzig, Erie, Pa., assignor to Erie Resistor Corporation, Erie, Pa., a corporation of Pennsylvania Filed Jan. 26, 1960, Ser. No. 4,653
8 Claims. (Cl. 333—72)

This invention is a piezoelectric coupling element of polarized ferroelectric ceramic. In one form, the piezoelectric element is a disc with a central hole which is enlarged to tune the element to lower frequencies. The central hole also provides a convenient support. In another form, the piezoelectric element comprises a bar having diametrically opposed electrodes at its center and other diametrically opposed electrodes at each end spaced between the center electrodes. The coupling elements have the function of transformers.

Figure 1:
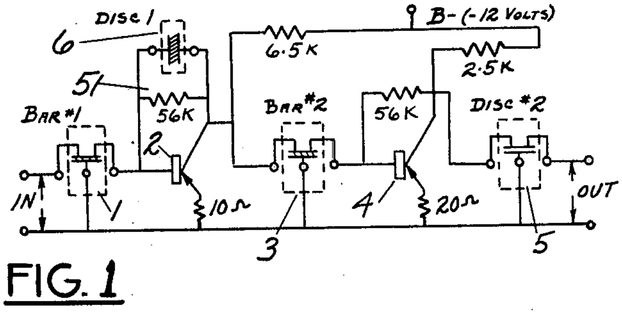
Figure 3:
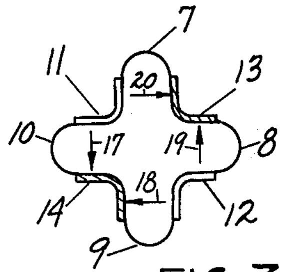
Figure 2:
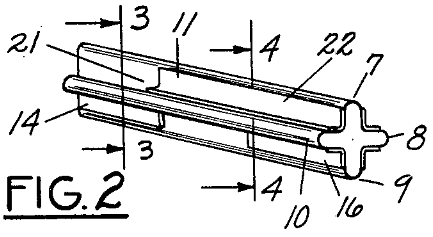
Figure 4:
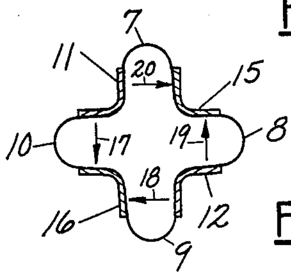
Figure 5:
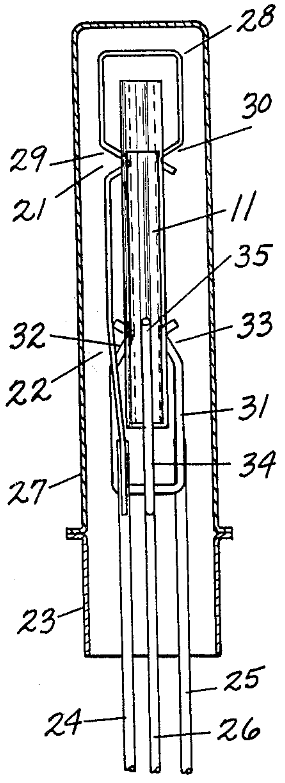
Figure 6:
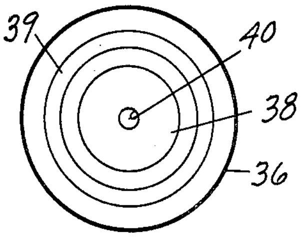
Figure 7:
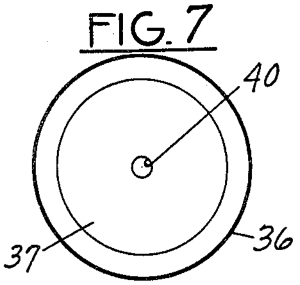
Figure 8:
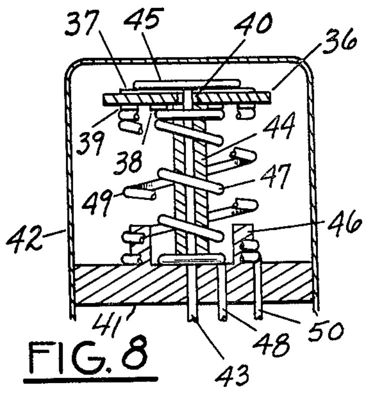
Figure 9:
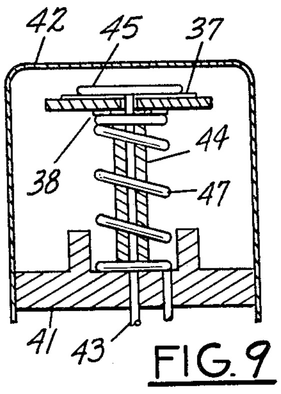
Figure 10:
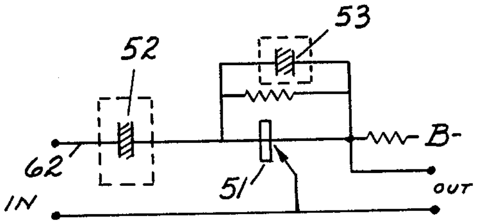
Figure 11:
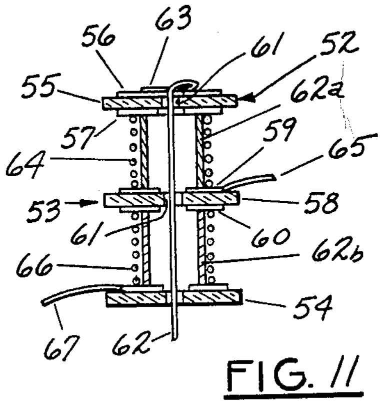
Figure 12:
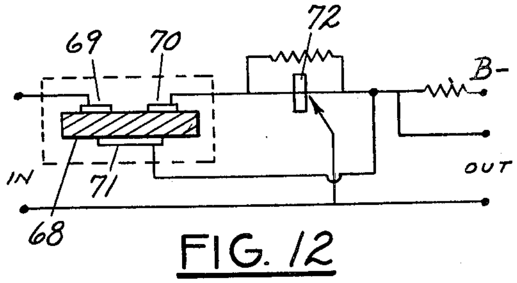
Figure 15:
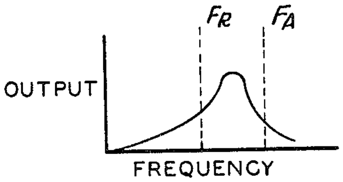
Figure 13:
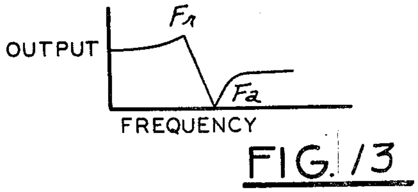
Figure 17:
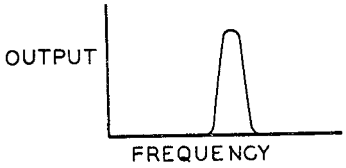
Figure 14:
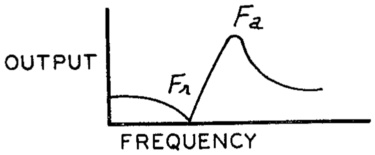
Figure 16:
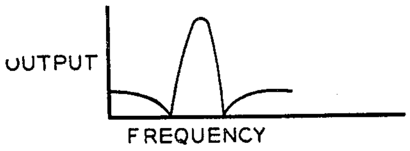

In the drawing, FIG. 1 is a circuit diagram, FIG. 2 is a side view of a piezoelectric bar used in one of the coupling elements, FIG. 3 is a section on line 3—3 of FIG. 2, FIG. 4 is a section on line 4—4 of FIG. 2, FIG. 5 is a sectional view of the coupling element using the piezoelectric bar of FIG. 2, FIG. 6 is a plan view of a piezoelectric disc used in another coupling element, FIG. 7 is a plan view of the FIG. 6 disc viewed from the opposite side, FIG. 8 is a sectional elevation of a coupling element using the FIG. 6 bar, FIG. 9 is a sectional side elevation of a feed back coupling element using the FIG. 6 disc with one electrode removed, FIG. 10 is a circuit diagram of an amplifier stage, FIG. 11 is a sectional side elevation of the piezoelectric coupling elements of FIG. 10, FIG. 12 is another circuit diagram of an amplifier stage using a single piezoelectric coupling element in place of the two piezoelectric coupling elements of FIG. 10, FIG. 13 is a curve of the output of an amplifier stage having a piezoelectric feed through element in its input, FIG. 14 is a curve showing the output of an amplifier stage having a piezoelectric feed back element, FIG. 15 is a curve of the output of an amplifier stage having a piezoelectric transformer in its input, FIG. 16 is a curve of the output of an amplifier stage having a feed through piezoelectric element in its input and a feed back piezoelectric in its output, and FIG. 17 is a curve showing the combined output of FIG. 16 plus another stage having a piezoelectric transformer in its input.

The invention is shown in connection with an intermediate frequency amplifier for a transistor radio having a transformer 1 connected to the input of a transistor 2, a transformer 3 connected from the output of the transistor 2 to the input of a transistor 4 and a transformer 5 connected in the output of the transistor 4. A filter or feed back element 6 is connected from the output back to the input of the transistor 2 to increase the gain and selectivity.

The transformers 1, 3 and 5 and the filter 6 all use piezoelectric bodies, such as polarized barium titanate or like ferroelectric ceramics. The frequencies of the piezoelectric bodies of transformers 1, 3 and 5 are tuned to produce maximum output at the operating frequency (i.e. the band of frequencies) to be amplified, for example 456 kilocycles in the case of the specific intermediate frequency amplifier illustrated. The frequency of maximum output as shown in the curve of FIG. 15 is between the resonant ($F_R$) and anti-resonant ($F_A$) frequencies of the piezoelectric bodies and is known as the pass band frequency. The anti-resonant frequency of the piezoelectric body of feed back element 6 is tuned to the pass band operating frequency. Tuning to anti-resonance provides an in phase feed back at frequencies within the band of frequencies to be amplified increasing the gain of the amplifier. At frequencies outside the band there is an out of phase feed back having the effect of suppressing these outside frequencies. The effect of feed back on amplifier output is shown in FIG. 14. An alternate method of explaining the action of disc 6 is to consider that at all frequencies remote from its anti-resonance, its impedance is so low that it disables the transistor. Only at frequencies near the anti-resonance of the disc is its impedance high enough to permit the transistor to function.

The piezoelectric bodies of transformers 1 and 3 are bars vibrating in the lengthwise mode at the second harmonic. The piezoelectric bodies of the transformer 5 and of the filter 6 are discs vibrating in the radial mode at the fundamental. By reason of the use of piezoelectric bodies of different shapes, spurious or unwanted responses are minimized because resonance of the bodies at the same unwanted response frequencies is avoided. At series resonance the input impedance of the transformer is so low that almost no energy is transferred from the input device to the transformer. At the anti-resonance frequencies of the piezoelectric bodies, the transformer impedance is so high that its power drain is a minimum also, and consequently almost no energy is available for transfer to the secondary. At an intermediate frequency the input impedance of the transformer is matched to the input device impedance, so that one-half the available energy is transferred to the transformer, and a further match of the output impedance with the next unit results in maximum power or energy transfer. A consequence of this characteristic is that the operating frequency range is somewhat dependent on the impedances of the associated devices.

Transformers 1 and 3 are of construction illustrated in FIGS. 2 to 5 inclusive. Each of these transformers uses an elongated bar of polarized ferroelectric ceramic such as barium titanate of size such that when vibrating in the lengthwise mode, its second harmonic coincides with the desired operating frequency. While the bar could be of square, triangular, or circular cross section, it is preferably made of X cross section with four substantially equally spaced radial flanges 7, 8 9, 10 extending the full length of the bar. From one aspect, the bar can be considered as four sided. At the center of the bar are diametrically opposite electrodes 11, 12 which serve as ground electrodes for the transformer. The electrode 11 is disposed on the side of the bar between flanges 7 and 10 while the electrode 12 is disposed on the side of the bar between flanges 8 and 9.

At opposite ends of the bar are pairs of diametrically opposite electrodes 13, 14 and 15, 16, one pair being input electrodes and the other pair being output electrodes. The electrodes 13 and 15 are disposed on the side of the bar between flanges 7 and 8 and the electrodes 14 and 16 are disposed on the side of the bar between flanges 9 and 10. Preferably, one end of the ground electrodes 11, 12 slightly overlaps the electrodes 13, 14 and the opposite end of the ground electrodes fully overlaps the electrodes 15, 16. It is not essential that there be any overlap, but it is preferable. The body is polarized by a field applied between the ground electrodes 11, 12 and the other electrodes 13, 14, 15, 16 producing the polarization indicated by the arrows 17, 18, 19, 20. The polarization is in the same direction at both ends of the piezoelectric body. When the body is excited in the lengthwise mode of vibration at the second harmonic, there are nodes of substantially no vibration at regions 21, 22 about one quarter of the way in from each end of the body. When the body is assembled into the transformer, both the electrical connections and the mechanical support of the body are through contacts at the nodes 21, 22.

The transformer as shown in FIG. 5 has a base 23 through which leads 24, 25, 26 extend and an enclosing cover 27. Each of the leads is connected to a contact of U-shape straddling the body. In the case of contact 28 connected to the lead 24, the U is formed at one end of the lead and the arms of the U are bent inwardly at 29, 30 respectively received between flanges 7, 8 and between flanges 9, 10. The end of the body adjacent the contact 28 is accessible to sanding or sand blasting for the purpose of tuning by adjusting the length of the body. The lead 25 is connected to a separate U-section 31 having at its outer ends bent inwardly at 32, 33 likewise respectively received between flanges 7, 8 and 9, 10. The lead 26 is connected to a similar U-section 34 of the same construction as the section 31 but at right angles thereto so that the inwardly bent contact portions fit respectively between flanges 7, 10 and 8, 9. Only one of these contact portions 34 is visible in FIG. 5; the other contact portion is diametrically opposite. The contact portions 29, 30 are at the node 21 and the contact portions 32, 33, 35 and the one opposite 35 are at the node 22.

In use, the lead 26 is the ground lead and one of the leads 24, 25 is the input and the other is the output. The body vibrates in the lengthwise mode at its second harmonic which is tuned to the frequency to be amplified. Assuming that the lead 24 is the input, the driving force applied between the electrodes 13, 14 and the ground electrodes 11, 12 excites the piezoelectric body to resonant vibration at its second harmonic. The mechanical vibration of the piezoelectric body transfers mechanical energy back to electrical energy which appears between the ground electrodes 11, 12 and the output electrodes 15, 16.

For the I.F. amplifier illustrated, the piezoelectric body is very small. When made of barium titanate, the length of the body is approximately one third of an inch, and the width across diametrically opposite flanges is less than one sixteenth of an inch.

The transformer 5 uses discs 36 of polarized ferroelectric ceramic such as barium titanate having on one face an electrode 37 and on the opposite face concentric annular electrodes 38, 39 substantially opposite the electrode 37. The filter 6 uses discs 36 of polarized ferroelectric ceramic such as barium titanate having on one face an electrode 37 and on the opposite face the electrode 38 substantially opposite the electrode 37. During polarization, the voltage is applied between the electrode 37 and the electrodes 38 and 39 connected in parallel. In other words, the disc is polarized in the thickness direction. When the disc is excited, for example by a voltage applied between the electrode 38 and the electrode 37, it vibrates in its radial mode at fundamental frequency. In the case of the transformer 5, the disc is tuned so that its operating frequency coincides with the frequency being amplified. In both cases, tuning is effected by increasing the size of a center hole 40 until the desired resonant or anti-resonant frequency is obtained, as the case may be. Increasing the size of the hole decreases the radial width of the disc between the hole and the periphery of the disc and thereby lowers the resonant frequency. Accordingly, by starting with discs whose resonant frequency is too high and increasing the size of the hole during excitation, the desired tuning is obtained. In the case of the transformer 5 as shown in FIG. 8, the transformer is mounted on a base 41 of insulating material to which is secured an enclosing cap 42. At the center of the base 41 is a lead 43 which extends up through a post 44 of insulating material and through the hole 40 in the disc 36, terminating in a coil 45 which engages the electrode 37. The electrode 37 is the ground lead of the transformer. On the upper side of the base 41 is an annular projection 46 surrounding a coil spring contact 47 having its upper end engaging the electrode 38 and its lower end connected to a lead 48 extending out through the base 41. Surrounding the annular projection 46 is a coil spring 49 having its upper end engaging and making contact with the electrode 39 and having its lower end connected to a lead 50 extending out through the base 41. From one aspect, the disc 36 is clamped between the coil springs 47, 49 on its under side and the coil 45 on its upper side. The disc can also be considered as clamped between the coil 45 and the upper end of the post 44. This provides a very convenient way of mounting the disc so that it can undergo the resonant vibration essential for transformer action.

In use, the input, for example, may be applied between lead 48 and ground lead 43, exciting the disc to resonant vibration at the tuned frequency which coincides with the frequency to be amplified. The mechanical energy caused by vibration of the disc is converted into electrical energy which appears between the ground lead 43 and the output lead 50.

The filter 6 shown in FIG. 9 is the same as the transformer shown in FIG. 8 except that the coil spring 49 and output lead 50 and electrode 39 are omitted. In the filter, the disc is tuned so that its anti-resonant frequency coincides with the frequency to be amplified. This provides a feed back from the output of the transistor. Although the circuits described use transistors, it is evident that the coupling element can also be used in circuits having tubes or other valve devices. A shunt resistor 51 holds the feed back to a level preventing oscillation. If the resistor 51 were omitted, the feed back would be sufficient for oscillation.

By using bar elements in the transformers 1 and 3 and disc elements in the transformer 5 and filter 6, spurious responses outside the frequency to be amplified are rejected or suppressed without interfering with the amplification of the fundamental frequency of the amplifier.

In FIG. 10 is shown an amplifier stage having a transistor 51 with a piezoelectric feed through coupling element 52 in its input and a piezoelectric feed back coupling 53 connected from the output back to its input. The feed through coupling element is a piezoelectric body tuned so that its resonant frequency is in the center of the band of frequencies to be amplified. If it alone were connected to the amplifier, the amplifier output would be as indicated in FIG. 13, being a maximum at the resonance frequency ($F_R$) and a minimum at the anti-resonant frequency ($F_A$). The feed back coupling element 53 is a piezoelectric body tuned so that its anti-resonant frequency is at the center of the band of frequencies to be amplified. If it alone were connected to the amplifier, the amplifier output would be as shown in FIG. 14, being a minimum at its resonant frequency ($F_R$) and a maximum at its anti-resonant frequency ($F_A$). With the combination of the feed through element 52 and the feed back element 53, the amplifier stage would have an output as indicated in FIG. 16 with a sharp peak at the center of the band of frequencies to be amplified.

As shown in FIG. 11, the feed through and feed back coupling elements 52 and 53 may be mounted on a common base 54. The feed through element is a disc 55 of ferroelectric ceramic polarized in its thickness direction with upper and lower electrodes 56, 57. The feed back coupling element is a disc 58 of ferroelectric ceramic also polarized in its thickness direction with upper and lower electrodes 59, 60. The discs 55 and 58 are similar to that shown in FIG. 6 and each has a hole 61 at the center. The input lead 62 for the coupling element 52 extends through the holes 61 in the discs 58 and 55 and is connected to the electrode 56 by a coil spring element 63. The electrodes 57 and 59 are connected to each other by a coil spring 64. The electrode 59, which is the output electrode of the coupling element 53, is connected to a lead 65. The input electrode 60 of the coupling element 53 is connected to a coil spring 66 and lead 67. Both of the discs 55 and 58 are supported at their center by hollow posts *62a*, *62b* surrounding the lead 62 and have resonant frequencies adjusted by enlarging the size of the holes 61. This adjusting or tuning is preferably done while the elements are connected in the amplifier circuit so that the amplifier gain is measured while the tuning is taking place.

Instead of using a feed through coupling element and a feed back coupling element as shown in FIGS. 10 and 11, the same effect can be obtained by using a piezoelectric transformer as shown in FIG. 12. In this circuit, the transformer 68 has an input electrode 69, an output electrode 70 and a ground electrode 71. When connected in the usual manner, the input would be connected across electrodes 69 and 71 and the output of the transformer would appear across electrodes 70 and 71. The operating frequency of the piezoelectric body of the transformer would be tuned to coincide with the center of the band of frequency to be amplified and the amplifier output would be as shown in FIG. 15. With the FIG. 12 arrangement, the ground electrode 71, instead of being connected to ground, is connected to the output of transistor 72. This causes the piezoelectric body 68 of the transistor to serve both as a feed through and a feed back coupling element so that the resultant amplifier output is changed from the form shown in FIG. 15 to the form shown in FIG. 16. The transformer for the FIG. 12 circuit can be the element illustrated in FIG. 8 where 43 is the ground electrode, 48 is the input electrode and 50 is the output electrode.

FIG. 16 shows the amplifier output of a single stage using the combination of a feed through and a feed back piezoelectric coupling element. FIG. 17 shows the amplifier output with an additional transformer coupled stage. The result is a sharpening of the response within the band of frequencies to be amplified and a reduction or elimination of unwanted frequencies outside the band.

What is claimed as new is:

1. In a tuned electronic circuit, a piezoelectric coupling element comprising a disc of ferroelectric ceramic material polarized in the thickness direction and having electrodes on opposite sides exciting the disc in the radial mode of vibration, said disc having a central hole which is enlarged to tune the disc to lower frequencies, and a mounting for the disc including a part engaging one side of the disc around the hole and a lead extending from said one side of the disc through said hole and engaging the electrode on the opposite side of the disc around said hole.

2. In a tuned electronic circuit, a piezoelectric coupling element comprising a disc of ferroelectric material polarized in the thickness direction and having electrodes on opposite sides exciting the disc in the radial mode of vibration, said disc having a central hole, a base spaced from one side of the disc, a lead extending from the base through said hole and engaging the electrode on the opposite side of the disc remote from the base, and another lead extending from the base and including a coil surrounding said first lead and engaging the electrode on the side of the disc adjacent the base.

3. In a tuned electronic circuit, a piezoelectric coupling element comprising a four sided bar of ferroelectric material having at its center electrodes on diametrically opposite sides of the bar and having at each end electrodes spaced from each other and likewise diametrically opposite each other but disposed on different sides of the bar, said bar being polarized from the center electrodes toward end electrodes, the electrodes at one end of the bar and the center electrodes comprising input electrodes, the center electrodes and the electrodes at the other end of the bar comprising output electrodes, said bar vibrating in its lengthwise mode at the second harmonic, and contacts engaging the input and output electrodes at the nodes of vibration.

4. In a tuned electronic circuit, a piezoelectric coupling element comprising a four sided bar of ferroelectric material having at its center electrodes on diametrically opposite sides of the bar and having at each end electrodes spaced from each other and likewise diametrically opposite each other but disposed on different sides of the bar, said bar being polarized from the center electrodes toward end electrodes, the electrodes at one end being input electrodes, the center electrodes being ground electrodes, the electrodes at the opposite end being output electrodes, said bar when vibrating in its lengthwise mode having nodes opposite each of said electrodes, and contacts gripping diametrically opposite portions of said electrodes at the nodes.

5. In a tuned electronic circuit, at least two piezoelectric coupling elements each comprising a disc of ferroelectric material polarized in the thickness direction and having electrodes on opposite sides exciting the disc in the radial mode of vibration, said disc having a central hole, and a mounting for the discs comprising a support engaging one side of one of the discs around its central hole, another support engaging one side of the other disc around its central hole and the opposite side of said one disc around its central hole, and a lead extending through said holes and engaging the electrode on the opposite side of said other disc.

6. The structure of claim 5 in which at least one of the supports is a hollow post through which the lead extends.

7. In a tuned electronic circuit, a piezoelectric coupling element comprising a disc of ferroelectric ceramic material polarized in the thickness direction and having two concentric annular electrodes on one side of the disc and a third annular electrode on the opposite side of the disc substantially opposite said first two electrodes, said disc having a central hole which is enlarged to tune the disc to lower frequencies, and said body having its resonant frequency in the radial mode tuned to the operating frequency of said circuit, one of said two electrodes and the third electrode being adapted to serve as input electrodes and the other of said two electrodes and the third electrode being adapted to serve as output electrodes.

8. In a piezoelectric coupling element comprising a disc of ferroelectric ceramic material polarized in the thickness direction and having electrodes on opposite sides exciting the disc in the radial mode of vibration, and said disc further having a central hole the method of tuning which comprises enlarging the hole to tune the disc to lower frequencies.

References Cited in the file of this patent

UNITED STATES PATENTS

| | | |
|---|---|---|
| 1,907,425 | Marrison | May 9, 1933 |
| 2,490,452 | Mason | Dec. 6, 1949 |
| 2,625,663 | Howatt | Jan. 13, 1953 |
| 2,659,869 | Allison | Nov. 17, 1953 |
| 2,691,074 | Eberhard | Oct. 5, 1954 |
| 2,742,614 | Mason | Apr. 17, 1956 |
| 2,750,452 | Goodrich | June 12, 1956 |
| 2,795,709 | Camp | June 11, 1957 |
| 2,802,992 | Doelz | Aug. 13, 1957 |
| 2,838,696 | Thurston | June 10, 1958 |
| 2,877,432 | Mattiat | May 10, 1959 |
| 2,906,973 | Mason | Sept. 29, 1959 |
| 2,927,285 | Curran | Mar. 1, 1960 |
| 2,943,279 | Mattiat | June 28, 1960 |
| 2,944,117 | Gray | July 5, 1960 |
| 2,947,821 | Heibel | Aug. 2, 1960 |
| 2,974,296 | Rosen | Mar. 7, 1961 |
| 2,976,501 | Mattiat | Mar. 21, 1961 |
| 3,051,919 | Faulk et al. | Aug. 28, 1962 |
| 3,069,563 | Fuss | Dec. 8, 1962 |